(12) United States Patent
Ingman et al.

(10) Patent No.: US 8,595,045 B2
(45) Date of Patent: Nov. 26, 2013

(54) METHODS, SYSTEMS, AND COMPUTER-READABLE MEDIA FOR PROVIDING FUTURE JOB INFORMATION

(71) Applicant: AT&T Intellectual Property I, L.P., Atlanta, GA (US)

(72) Inventors: Robert Ingman, Peachtree City, GA (US); Robert Cole, Birmingham, AL (US); Richard Miller, Hoover, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/872,881

(22) Filed: Apr. 29, 2013

(65) Prior Publication Data

US 2013/0238377 A1   Sep. 12, 2013

Related U.S. Application Data

(63) Continuation of application No. 13/533,402, filed on Jun. 26, 2012, now Pat. No. 8,433,598, which is a continuation of application No. 11/779,087, filed on Jul. 17, 2007, now Pat. No. 8,249,905.

(51) Int. Cl.
*G06Q 10/00* (2012.01)
(52) U.S. Cl.
USPC ........................ 705/7.14; 705/7.11
(58) Field of Classification Search
USPC .................................. 705/7, 8, 9, 7.11
See application file for complete search history.

(56) References Cited

U.S. PATENT DOCUMENTS

| | | | | |
|---|---|---|---|---|
| 5,542,088 A | * | 7/1996 | Jennings et al. | 718/103 |
| 6,006,171 A | * | 12/1999 | Vines et al. | 702/184 |
| 6,134,530 A | * | 10/2000 | Bunting et al. | 705/7.25 |
| 6,639,982 B1 | | 10/2003 | Stuart et al. | |
| 6,845,394 B2 | | 1/2005 | Ritche | |
| 7,283,971 B1 | * | 10/2007 | Levine et al. | 705/7.13 |
| 8,396,571 B2 | | 3/2013 | Costiner et al. | |
| 8,509,246 B2 | | 8/2013 | Stewart | |
| 2002/0029161 A1 | * | 3/2002 | Brodersen et al. | 705/9 |
| 2002/0040313 A1 | * | 4/2002 | Hunter et al. | 705/9 |
| 2003/0033184 A1 | | 2/2003 | Benbassat et al. | |
| 2003/0187710 A1 | * | 10/2003 | Baumer et al. | 705/8 |
| 2003/0220734 A1 | | 11/2003 | Harrison et al. | |
| 2004/0010334 A1 | | 1/2004 | Bickley et al. | |
| 2004/0220825 A1 | | 11/2004 | Schwerin-Wenzel et al. | |
| 2004/0254805 A1 | | 12/2004 | Schwerin-Wenzel et al. | |

(Continued)

FOREIGN PATENT DOCUMENTS

EP       1139247 A1 *  10/2001

OTHER PUBLICATIONS

Notice of Allowance mailed May 14, 2013 in U.S. Appl. No. 13/688,588.
U.S. Appl. No. 13/525,979 Office Action mailed Sep. 17, 2013.

*Primary Examiner* — William Rankins
(74) *Attorney, Agent, or Firm* — Hartman & Citrin LLC (57) ABSTRACT

Methods, systems, and computer-readable media provide for providing future job information. According to embodiments, a method for providing future job information is provided. According to the method, a number of non-dispatched jobs within a future time frame for a plurality of buckets and a plurality of turfs is determined. A numeric indicator indicating the number of non-dispatched jobs associated with at least one turf and at least one bucket is displayed.

20 Claims, 9 Drawing Sheets

(56) References Cited

U.S. PATENT DOCUMENTS

| | | | |
|---|---|---|---|
| 2005/0015504 A1* | 1/2005 | Dorne et al. | 709/229 |
| 2005/0288970 A1 | 12/2005 | Holcom et al. | |
| 2006/0064338 A1* | 3/2006 | Brotman et al. | 705/9 |
| 2006/0129691 A1 | 6/2006 | Coffee et al. | |
| 2006/0206246 A1 | 9/2006 | Walker | |
| 2006/0241853 A1 | 10/2006 | Gadler | |
| 2006/0241855 A1 | 10/2006 | Joe et al. | |
| 2006/0244638 A1 | 11/2006 | Lettau | |
| 2007/0129082 A1 | 6/2007 | Thacher | |
| 2007/0129880 A1 | 6/2007 | Thacher | |
| 2007/0219842 A1* | 9/2007 | Bansal et al. | 705/9 |
| 2007/0279214 A1 | 12/2007 | Buehler | |
| 2008/0046803 A1* | 2/2008 | Beauchamp et al. | 715/212 |
| 2008/0162242 A1* | 7/2008 | Schneur et al. | 705/9 |
| 2009/0177375 A1 | 7/2009 | Jung et al. | |

* cited by examiner

Assignment Group: SE_Birmingham  Runtime: Wed Oct 11 12:05:00 CDT 2006

| RMC | TURF | POTS | | | | DSL | | | | CABLE | | | | SPECIALS | | | | NON Demand | | | | Clocks | | | |
|---|---|---|---|---|---|---|---|---|---|---|---|---|---|---|---|---|---|---|---|---|---|---|---|---|---|
| | | H | T | D | F | H | T | D | F | H | T | D | F | H | T | D | F | H | T | D | F | I | OS Res | Maint AS | HT | SC |
| 623 | Alabaster | 10 | 6 | 4 | 1 | 11 | 10 | 2 | 1 | 0 | 0 | 2 | 1 | 8 | 2 | 1 | 0 | 10 | 4 | 4 | 0 | 3 | 1 | 1 | 2 | 0 |
| 023 | Bham_Airport | | | | | | | | | | | | | 0 | 0 | 0 | 0 | 0 | 0 | 0 | 0 | 3 | 1 | 1 | 0 | 0 |
| 423 | Cahaba_Hghts | | | | | | | | | | | | | 3 | 1 | 0 | 0 | 0 | 2 | 0 | 0 | 3 | 1 | 1 | 0 | 0 |
| 623 | Calera | | | | | | | | | | | | | 0 | 0 | 0 | 0 | 0 | 0 | 0 | 0 | 3 | 1 | 1 | 0 | 0 |
| 123 | Center_Point | | | | | | | | | | | | | 0 | 0 | 0 | 0 | 1 | 0 | 1 | 0 | 3 | 1 | 1 | 2 | 1 |
| 622 | Centreville | | | | | | | | | | | | | 0 | 0 | 0 | 0 | 0 | 0 | 0 | 0 | 3 | 1 | 1 | 0 | 0 |
| 023 | Century_Plaza | | | | | | | | | | | | | 1 | 1 | 0 | 0 | 0 | 0 | 1 | 0 | 3 | 1 | 1 | 1 | 0 |
| 723 | Chelsea | | | | | | | | | | | | | 0 | 0 | 0 | 0 | 0 | 0 | 0 | 0 | 3 | 1 | 1 | 0 | 0 |
| 723 | Columbiana | | | | | | | | | | | | | 6 | 2 | 0 | 0 | 0 | 0 | 0 | 0 | 3 | 1 | 1 | 1 | 0 |
| 323 | Datadrive | | | | | | | | | | | | | 0 | 0 | 0 | 0 | 0 | 0 | 1 | 0 | 3 | 1 | 1 | 0 | 0 |
| 223 | Homewood | | | | | | | | | | | | | 11 | 1 | 1 | 0 | 2 | 109 | 1 | 1 | 3 | 1 | 1 | 1 | 0 |
| 323 | Hoover | | | | | | | | | | | | | 0 | 0 | 0 | 0 | 3 | 0 | 0 | 0 | 3 | 1 | 1 | 0 | 0 |
| 223 | Irondale | | | | | | | | | | | | | 0 | 0 | 0 | 0 | 8 | 0 | 2 | 0 | 3 | 1 | 1 | 1 | 0 |
| 623 | Montevallo | | | | | | | | | | | | | 0 | 0 | 0 | 0 | 0 | 1 | 0 | 0 | 3 | 1 | 1 | 0 | 0 |
| 423 | Oak_Mtn | | | | | | | | | | | | | 0 | 0 | 0 | 0 | 1 | 0 | 1 | 0 | 3 | 1 | 1 | 1 | 0 |
| 123 | Pinson | | | | | | | | | | | | | 0 | 0 | 0 | 0 | 0 | 0 | 0 | 0 | 3 | 1 | 1 | 0 | 0 |
| 323 | Riverchase | | | | | | | | | | | | | 0 | 0 | 0 | 0 | 1 | 0 | 1 | 0 | 3 | 1 | 1 | 0 | 0 |
| 323 | RiverchseMal1 | | | | | | | | | | | | | 0 | 0 | 0 | 0 | 0 | 0 | 0 | 0 | 3 | 1 | 1 | 0 | 0 |
| 323 | RiverchseMal2 | | | | | | | | | | | | | 0 | 0 | 0 | 0 | 0 | 0 | 0 | 0 | 3 | 1 | 1 | 0 | 0 |
| 323 | RiverchseMall | | | | | | | | | | | | | 0 | 0 | 0 | 0 | 0 | 0 | 0 | 0 | 3 | 1 | 1 | 0 | 0 |

TURF: Alabaster
Supervisor (pots):
Name: Pike Hawkins
Phone: 205-663-1016
Cell: 205-960-4944

Supervisor (dsl):
Name: Harriett Bobo
Phone: 205-988-9602
Cell: 205-213-5234

Supervisor (cable):
Name: Pike Hawkins
Phone: 205-663-1016
Cell: 205-960-4944

1) Calera
2) Montevallo
3) Chelsea
4) Columbiana
5) Riverchase

METHODS, SYSTEMS, AND COMPUTER-READABLE MEDIA FOR PROVIDING FUTURE JOB INFORMATION

CROSS-REFERENCE TO RELATED APPLICATIONS

The present application is a continuation of U.S. patent application Ser. No. 13/533,402, now U.S. Pat. No. 8,433,598, filed Jun. 26, 2012, titled "Methods, Systems, and Computer-Readable Media for Providing Future Job Information," which is a continuation of U.S. patent application Ser. No. 11/779,087, now U.S. Pat. No. 8,249,905, filed Jul. 17, 2007, titled "Methods, Systems, and Computer-Readable Media for Providing Future Job Information," which is related to U.S. patent application Ser. No. 11/778,953, now U.S. Pat. No. 8,352,302, filed Jul. 17, 2007, titled "Methods, Systems, And Computer-Readable Media For Determining A Plurality Of Turfs From Where To Reallocate A Workforce To A Given Turf"; U.S. patent application Ser. No. 11/778,999, now U.S. Pat. No. 8,380,744, filed Jul. 17, 2007, titled "Methods, Systems, And Computer-Readable Media For Generating A Report Indicating Job Availability"; U.S. patent application Ser. No. 11/779,027, now U.S. Pat. No. 8,060,401, filed Jul. 17, 2007, titled "Methods, Systems, And Computer-Readable Media For Providing An Indication Of A Schedule Conflict"; U.S. patent application Ser. No. 11/779,054, now U.S. Pat. No. 8,069,072, filed Jul. 17, 2007, titled "Methods, Systems, And Computer-Readable Media For Providing An Indication Of Hightime"; U.S. patent application Ser. No. 11/778,867, now abandoned, filed Jul. 17, 2007, titled "Methods, Systems, And Computer-Readable Media For Providing Notification Of A Last Job Dispatch"; U.S. patent application Ser. No. 11/778,919, now U.S. Pat. No. 8,239,232, filed Jul. 17, 2007, titled "Methods, Systems, And Computer-Readable Media For Providing Commitments Information Relative To A Turf"; U.S. patent application Ser. No. 11/778,962, now U.S. Pat. No. 8,341,547, filed Jul. 17, 2007, titled "Methods, Systems, And Computer-Readable Media For Providing Contact Information At Turf Level"; U.S. patent application Ser. No. 11/779,011, filed Jul. 17, 2007, titled "Methods, Systems, And Computer-Readable Media For Providing A Ratio Of Tasks Per Technician"; and U.S. patent application Ser. No. 11/779,073, now abandoned, filed Jul. 17, 2007, titled "Methods, Systems, And Computer-Readable Media For Providing Workforce To Load Information"; each of which is hereby incorporated herein by reference.

TECHNICAL FIELD

This application relates generally to the field of load balancing. More specifically, the disclosure provided herein relates to the field of dynamic workforce reallocation.

BACKGROUND

Telecommunications networks may provide a number of services, such as plain old telephone service ("POTS"), digital subscriber line ("DSL"), and cable. A telecommunications network may be divided into a plurality of geographic areas known as turfs. Maintenance of the telecommunications network generally involves a proper reallocation of technicians across the turfs such that work orders can be timely filled. For example, when one turf experiences a high volume of work orders, it may be desirable to reallocate available technicians from another, preferably nearby, turf with a low volume of work orders to help with the high volume. The reallocation of technicians may be based on a number of factors, such as the location, skills, schedule, and availability of the technicians, as well as the priority of the work orders and the amount of time to complete the work orders.

A technician is typically given a work schedule at the beginning of each work shift. The work schedule may include each work order to be completed by the technician during a given work shift. Ideally, the technician's work schedule includes a sufficient amount of work such that unproductive time (i.e., time in which the technician is waiting to be dispatched to a job) is minimized. There may be times, however, when the technician's work schedule does not include enough work orders to fill the work shift, thereby leaving a significant amount of unproductive time. One way to fill the technician's work schedule with additional work orders is to move work orders from future work shifts to the current work shift.

A load balance supervisor ("LBS") may be assigned to coordinate the reallocation of technicians within a plurality of turfs. Information related to future jobs may be useful to the LBS and other load balancing personnel. The LBS conventionally relies on multiple filter changes in an Integrated Dispatch System ("IDS") to identify future jobs that may be moved between work shifts. Performing these multiple filter changes can be time consuming, thereby increasing the unproductive time of the technician.

SUMMARY

Embodiments of the disclosure presented herein include methods, systems, and computer-readable media for providing future job information. According to one aspect, a method for providing future job information is provided. According to the method, a number of non-dispatched jobs within a future time frame for a plurality of buckets and a plurality of turfs is determined. A numeric indicator indicating the number of non-dispatched jobs associated with at least one turf and at least one bucket is displayed.

According to another aspect, a system for providing future job information is provided. The system includes a memory and a processor functionally coupled to the memory. The memory stores a program containing code for providing future job information. The processor is responsive to computer-executable instructions contained in the program and operative to determine a number of non-dispatched jobs within a future time frame for a plurality of buckets and a plurality of turfs, and display a numeric indicator indicating the number of non-dispatched jobs associated with at least one turf and at least one bucket.

According to yet another aspect, a computer-readable medium having instructions stored thereon for execution by a processor to perform a method for providing future job information is provided. According to the method, a number of non-dispatched jobs within a future time frame for a plurality of buckets and a plurality of turfs is determined. A numeric indicator indicating the number of non-dispatched jobs associated with at least one turf and at least one bucket is displayed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for determining a plurality of turfs from where to reallocate a workforce to a given turf. In the following detailed description, references are made to the accompanying drawings that form a part hereof, and which are shown by way of illustration specific embodiments or examples.

As used herein, the terms "work order," "job," and "task" are used interchangeably. Although not so limited, embodiments described herein primarily refer to a "work order" as the maintenance and repair of a telecommunications network by a technician. However, it will be apparent to one of ordinary skill in the art that, in further embodiments, a "work order" may include any suitable service that involves the allocation and reallocation of personnel to perform the service.

Embodiments described herein provide a Next Generation Load Balance ("NGLB") tool for work force reallocation. According to exemplary embodiments, the NGLB tool has a graphical user interface ("GUI"), such as a GUI 400 of FIG. 5, containing an organized overview of work order and technician statuses within a plurality of turfs. The NGLB tool may be utilized by a load balance supervisor ("LBS") or other load balancing personnel to aid in the coordination of work force reallocation within the plurality of turfs. In one embodiment, the NGLB tool is provided to the LBS as a web-based application that can be accessed remotely via, for example, a web browser. In addition, the NGLB tool may be stored on a computing device used by the LBS to balance personnel.

Figure 3:
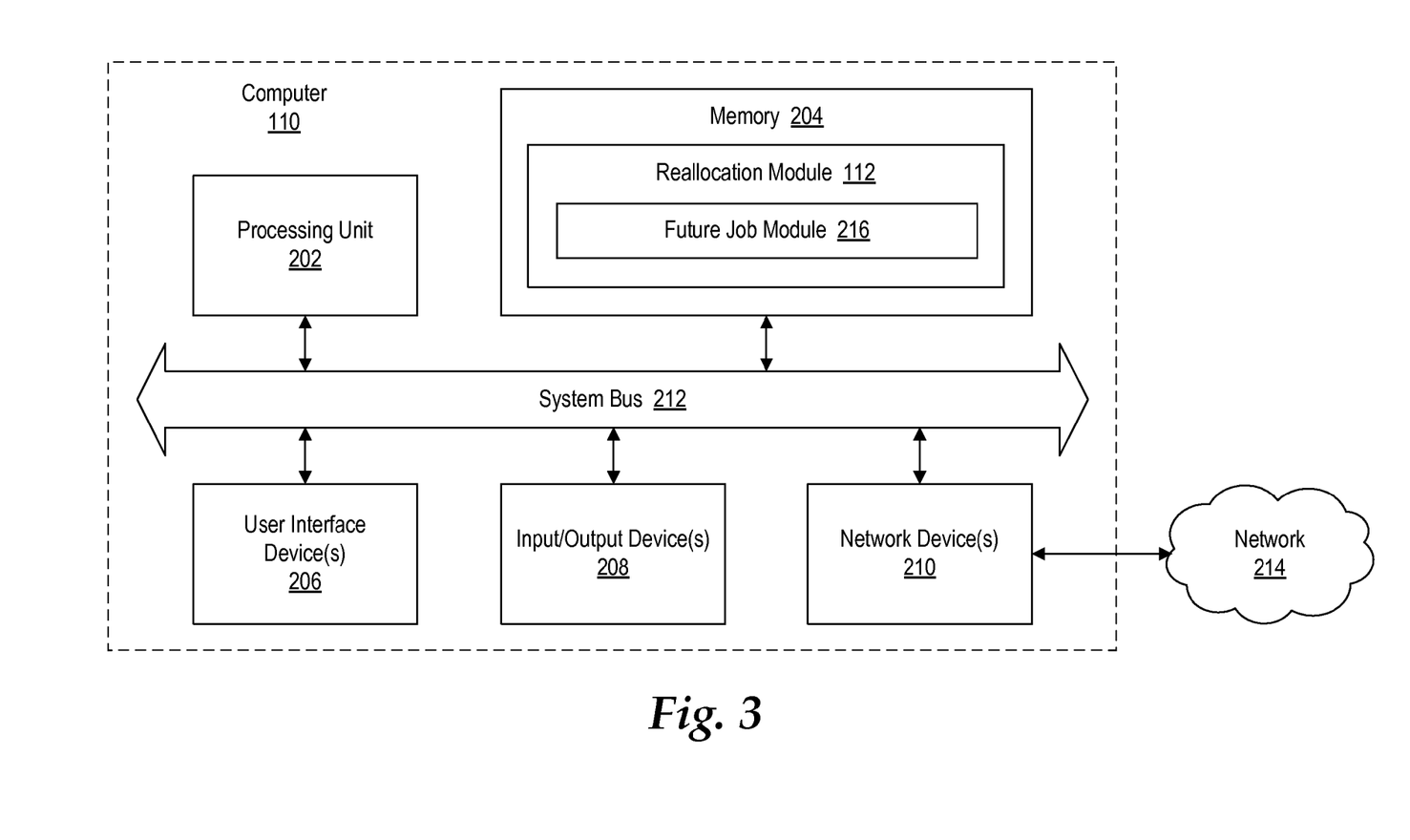
FIG. 3 is a block diagram illustrating a computer configured to provide a GUI that aids in the reallocation of the technicians across a plurality of turfs, in accordance with exemplary embodiments.
Figure 4:
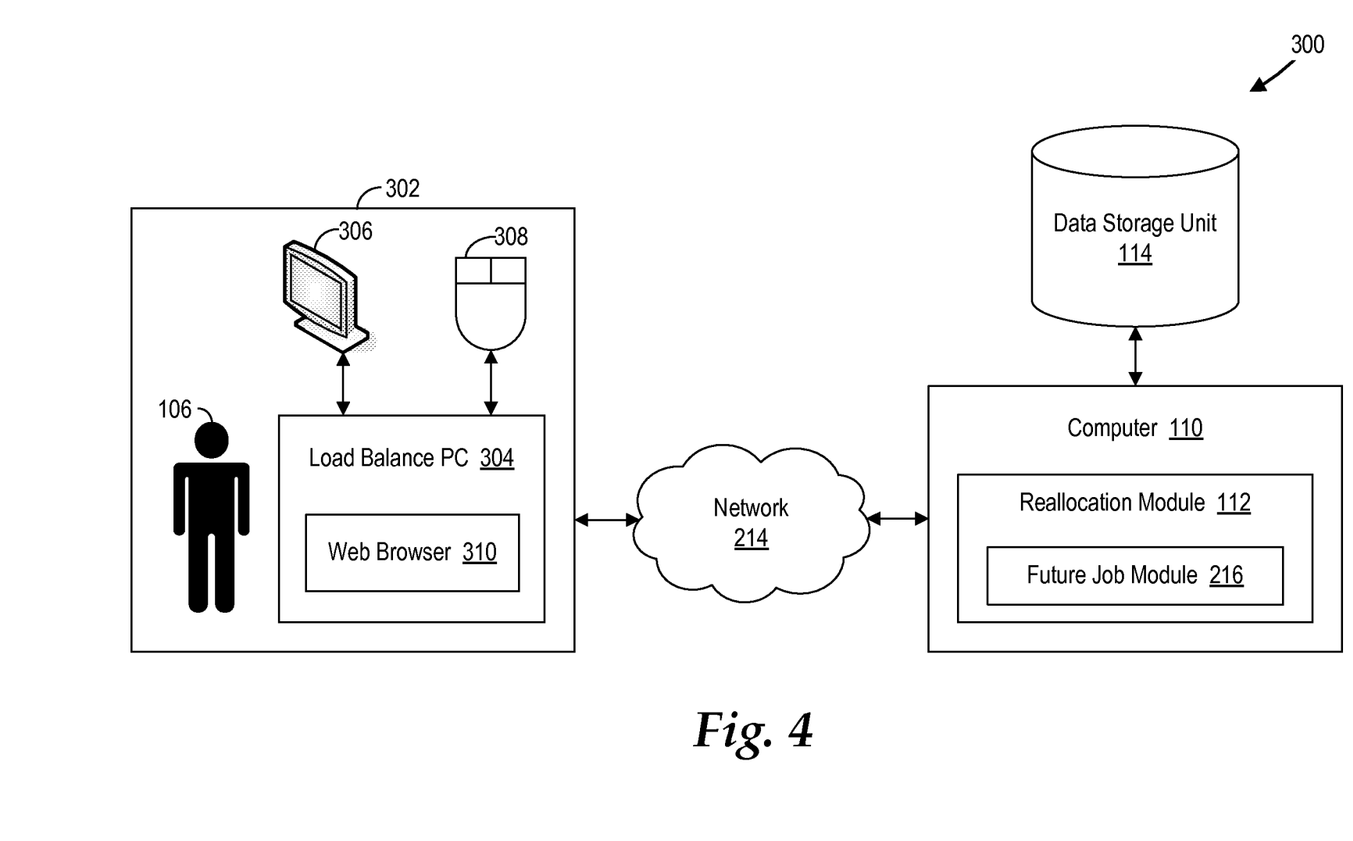
FIG. 4 is a block diagram of a workforce reallocation system, in accordance with exemplary embodiments.

According to further embodiments, the NGLB tool includes a future job module, such as a future job module 216 of FIGS. 3 and 4. The future job module 216 provides future job information for each of a plurality of turfs, such as turfs 402, 404, 406, 408, 410, 412, in accordance with exemplary embodiments. As used herein, a future job refers to a job scheduled for a future work shift (i.e., ahead of a current work shift). Further, as used herein, future job information refers to any suitable information related to the future job, including, but not limited to, a number of future jobs available, a job identification ("ID") number, a type of work to be performed on the future job, and a duration of time with which a technician, such as a technician 102, is expected to complete the future job. The future job module 216 may provide the future job information via the GUI 400 of FIG. 5. The GUI 400 may provide an organized presentation of the future job information, as described in greater detail below.

Figure 1:
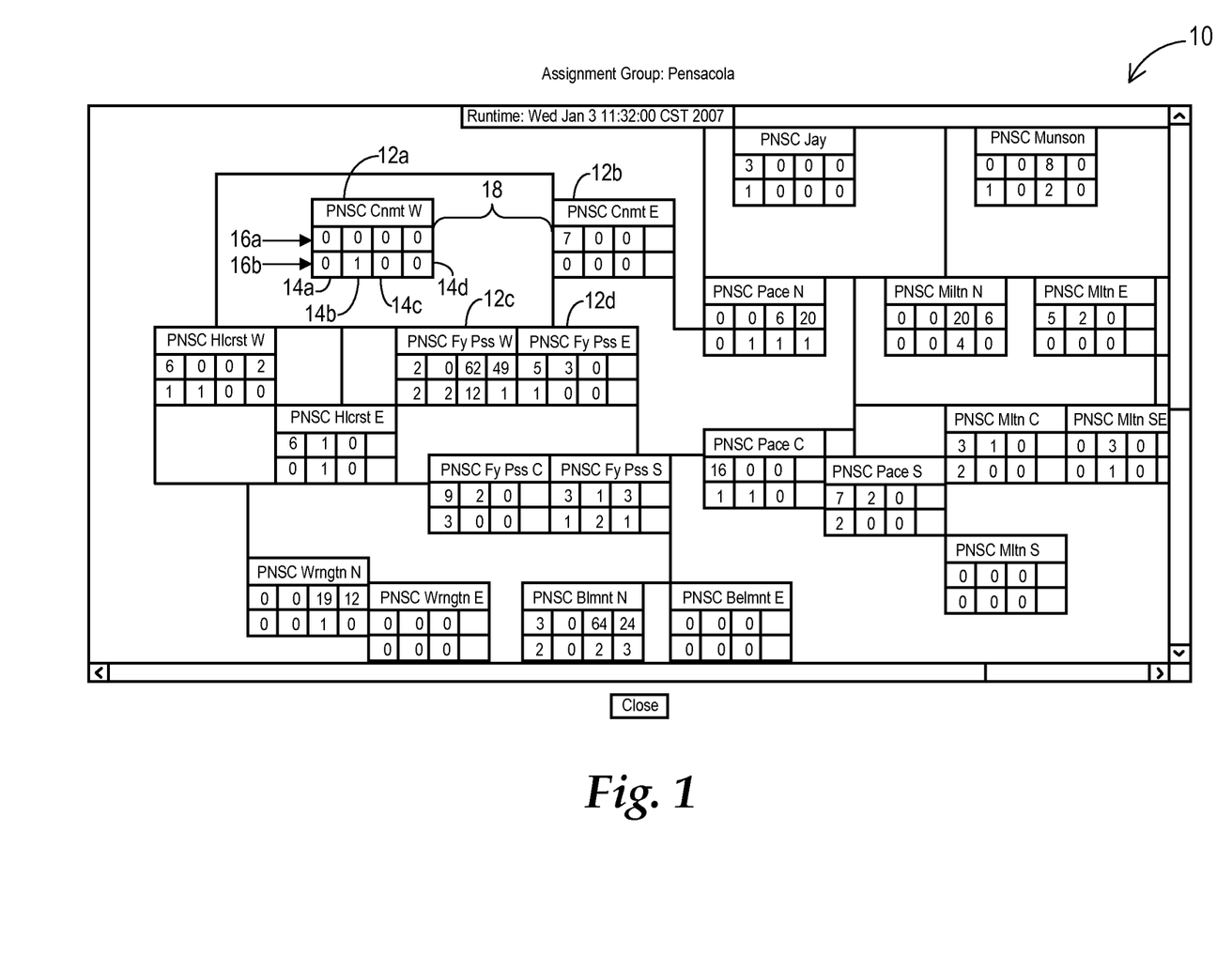
FIG. 1 is a diagram of an exemplary embodiment of a graphical user interface ("GUI") in a previous version.

Referring now to the drawings, it is to be understood that like numerals represent like elements through the several figures, and that not all components and/or steps described and illustrated with reference to the figures are required for all embodiments. FIG. 1 is an exemplary embodiment of the GUI 10 utilized in a previous version of the NGLB tool implemented by assignee of this application on or about April 2005. As illustrated in FIG. 1, the GUI 10 includes a plurality of turfs, such as turfs 12a, 12b, 12c, 12d. Each of the turfs, such as the turf 12a, includes four columns 14a, 14b, 14c, 14d. Each of the four columns 14a, 14b, 14c, 14d includes a first cell 16a and a second cell 16b. The first cell 16a includes job information and the second cell 16b includes technician information, according to one embodiment. The GUI 10 provides map presentation of the turfs 12a, 12b, 12c, 12d. The map presentation provides a visual mapping of physical distances between each of the plurality of the turfs 12a, 12b, 12c, 12d. In one example, the physical distance between the turf 12a and the turf 12b is a distance 18. In another example, the turf 12c and turf 12d are contiguous as indicated by the turf 12c being in contact with the turf 12d in the GUI 10.

Figure 2:
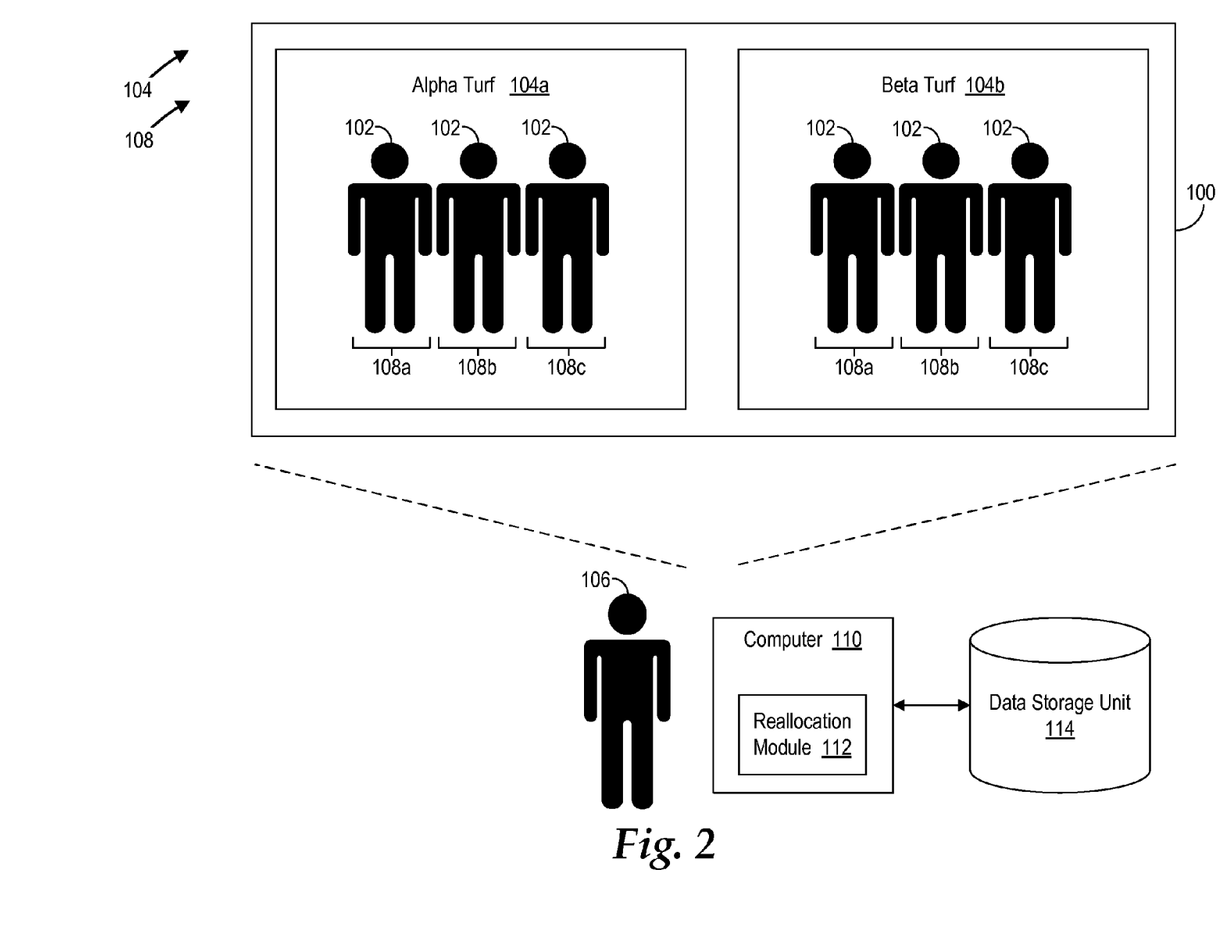
FIG. 2 is a high-level diagram illustrating an allocation of technicians for maintaining and repairing a telecommunications network, in accordance with exemplary embodiments.

FIGS. 2-9 as described below illustrate a current version of the NGLB tool. FIG. 2 is a high-level diagram illustrating an allocation of the technicians 102 for maintaining and repairing a telecommunications network 100, in accordance with exemplary embodiments. The telecommunications network 100 is maintained and repaired by a plurality of the technicians 102. As illustrated in FIG. 2, each of the technicians 102 is assigned to an Alpha turf 104a or a Beta turf 104b (collectively turfs 104) by a LBS 106 or other load balancing personnel, according to exemplary embodiments. Each turf 104 includes a plain old telephone service ("POTS") bucket 108a, a digital subscriber line ("DSL") bucket 108b, and a cable bucket 108c (collectively buckets 108), according to one embodiment. Each of the buckets 108 represents a discipline in which one or more of the technicians 102 may be assigned based on the skill set of the technician 102. In particular, the technician 102 in the POTS bucket 108a should have a skill set for completing POTS related work orders. The technician 102 in the DSL bucket 108b should have a skill set for completing DSL related work orders, and the technician 102 in the cable bucket 108c should have a skill set for completing cable related work orders. In one embodiment, one or more of the technicians 102 may include multiple skill sets for completing work orders under multiple buckets 108. The technicians 102 may be managed by one or more field supervisors (not shown). For example, the technicians 102 in each bucket 108 may be managed by a separate field supervisor.

For the sake of simplicity and without limitation, only two turfs 104a and 104b and three buckets 108a, 108b, and 108c are illustrated in FIG. 2. However, it will be apparent to those of ordinary skill in the art that the telecommunications network 100 may include any suitable number of turfs 104 and any suitable number and types of buckets 108, according to further embodiments.

The LBS 106 utilizes a computer 110 to aid in reallocating the plurality of technicians 102 across the turfs 104. The computer 110 includes a reallocation module 112, which enables the computer 110 to display a graphical user interface ("GUI"), such as the GUI 400 of FIG. 5, that provides the LBS 106 with an organized, visual presentation of the technicians 102, the turfs 104, and the buckets 108, according to one embodiment. In one example, if work orders in the Alpha turf 104a cannot be timely filled without additional technicians 102, the LBS 106 may view the GUI 400 to determine if the technicians 102 in the Beta turf 104b can be utilized. In a further example, if service orders in the POTS bucket 108a cannot be timely filled without additional technicians 102, the LBS 106 may view the GUI 400 to determine if the technicians 102 in the DSL bucket 108b or the cable bucket 108c are qualified to fill POTS work orders. In one embodiment, the computer 110 functions as a web server located remotely from the LBS 106 by executing a web server application, such as BEA WEBLOGIC SERVER from BEA SYSTEMS. In this embodiment, the LBS 106 may access the GUI 400 over a network, such as a network 214 of FIGS. 3 and 4, using, for example, a local web browser interface on a personal computer ("PC") or other computing device.

Figure 5:
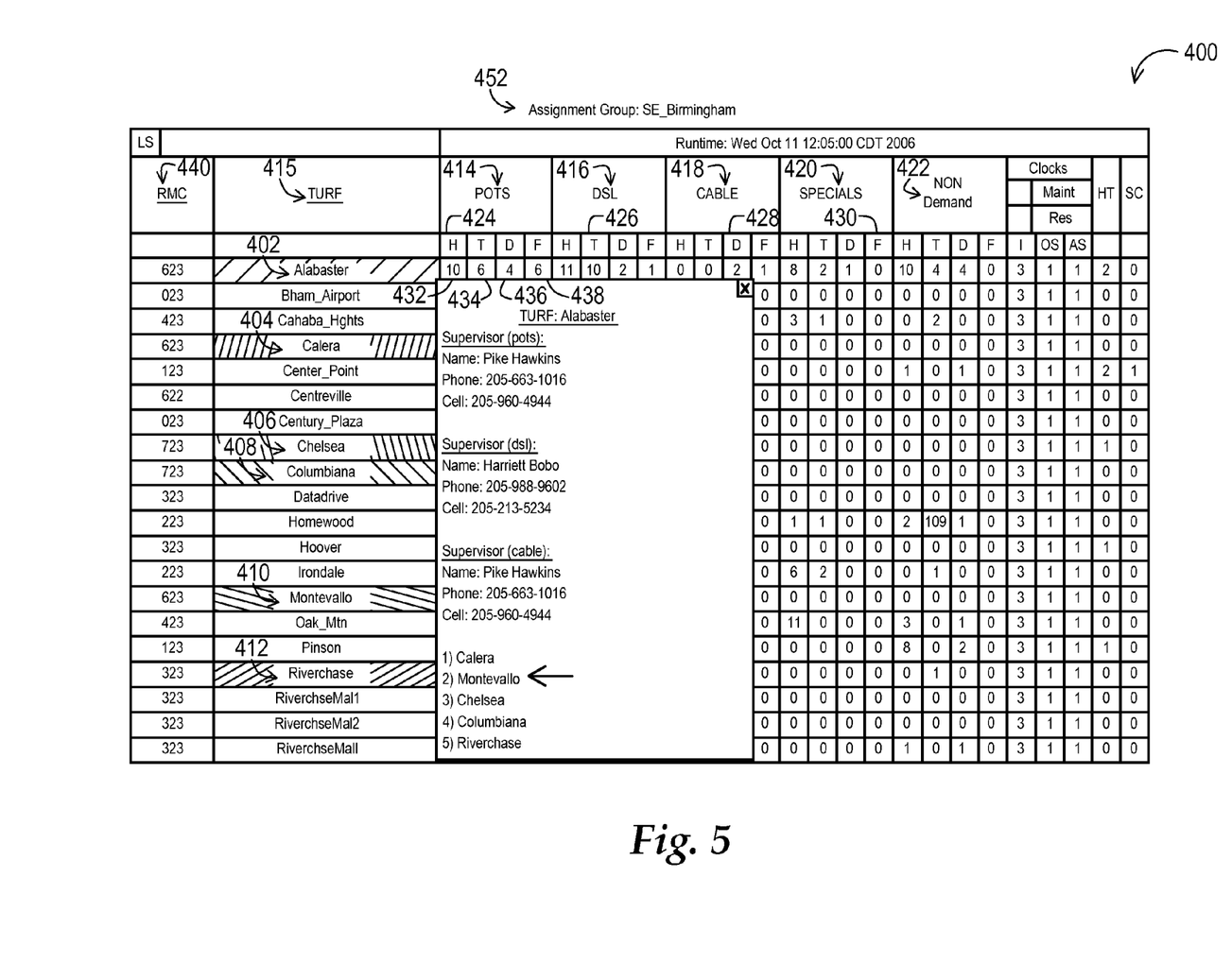
FIG. 5 is a diagram of a GUI, in accordance with exemplary embodiments
Figure 6:
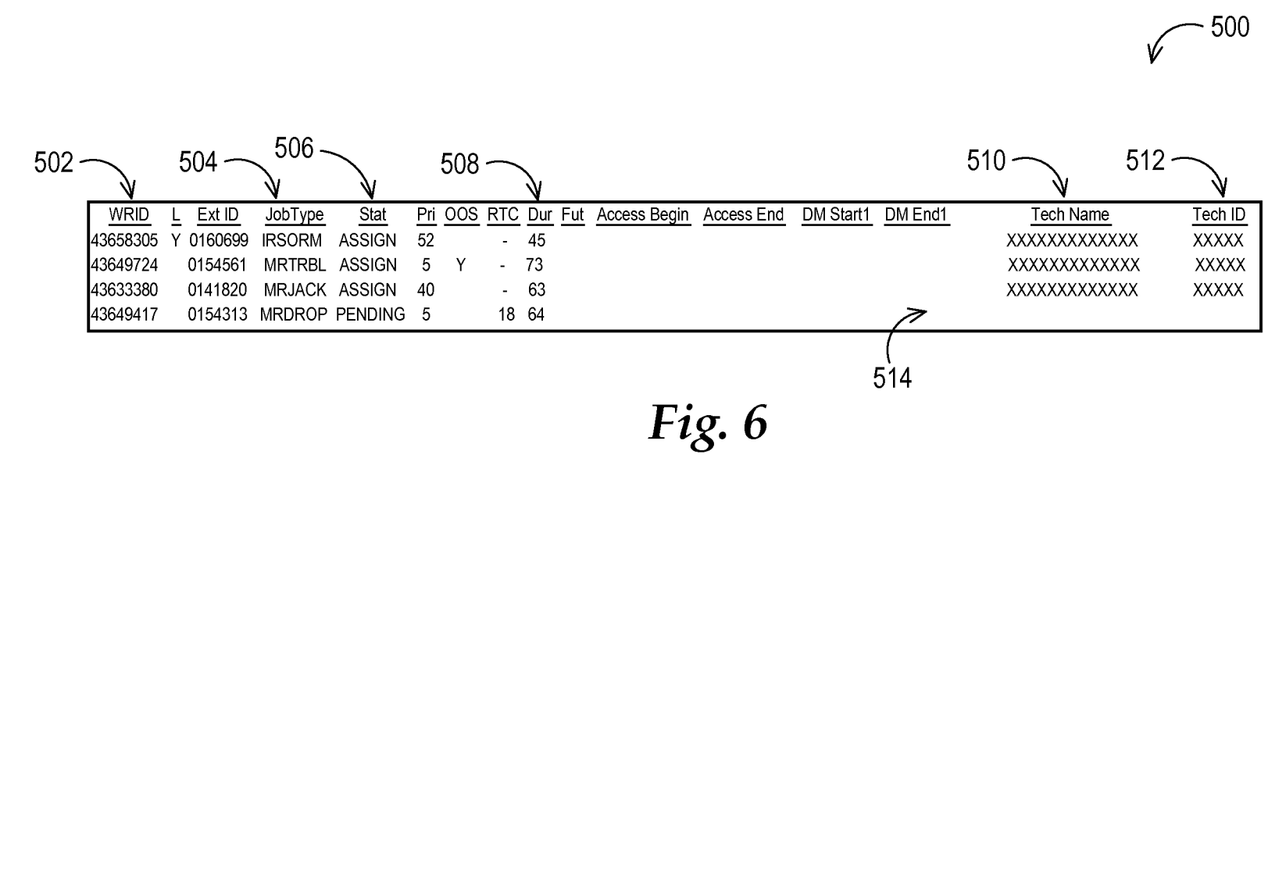
FIG. 6 is a diagram of a drop-down window in the GUI of FIG. 5, in accordance with exemplary embodiments.
Figure 7:
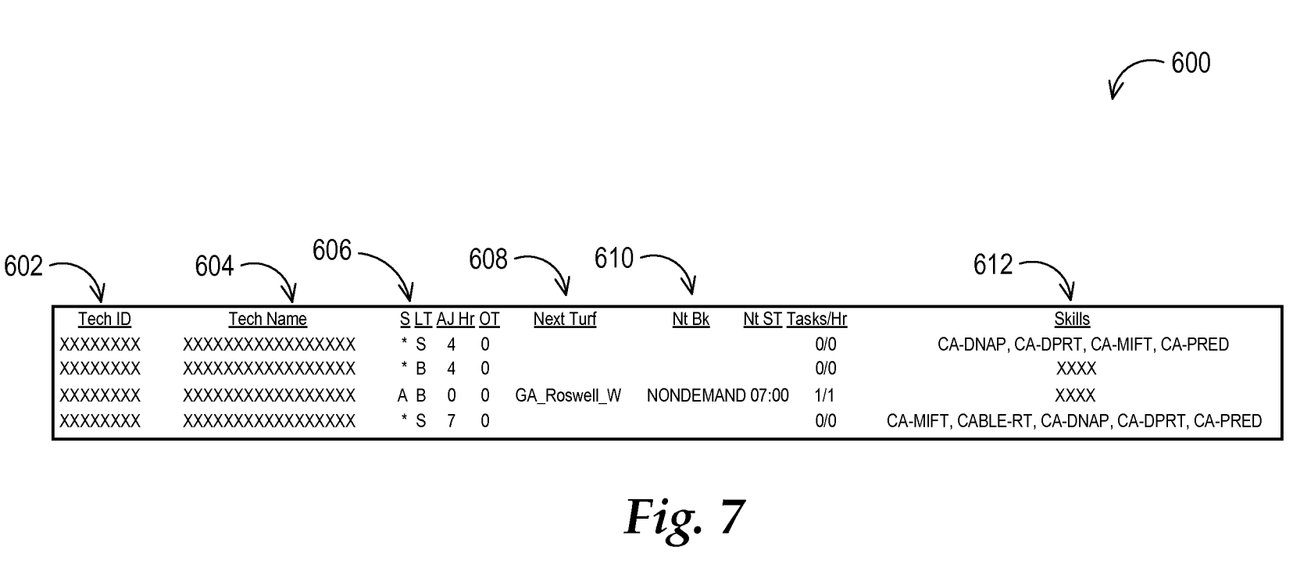
FIG. 7 is diagram of another drop-down window in the GUI of FIG. 5, in accordance with exemplary embodiments.

In one embodiment, the reallocation module 112 generates at least a portion of the GUI 400 based on data stored in a data storage unit 114. The data storage unit 114 may store any suitable data related to the technicians 102, such as the location, skills, schedule, and availability of the technicians 102. The data storage unit 114 may be a database. In one embodiment, the data storage unit 114 is an Integrated Dispatch System ("IDS"). The IDS is described in greater detail in U.S. Patent Application Publication No. 2004/0111311, entitled "Turfs and Skills for Multiple Technicians," to Ingman et al.; U.S. Patent Application Publication No. 2004/0111312, entitled "Validating Turfs for Work Orders," to Ingman et al.; U.S. Patent Application Publication No. 2004/0111313, entitled "Methods and Systems for Assigning Multiple Tasks," to Ingman et al.; and U.S. Patent Application Publication No. 2004/0111634, entitled "Security Permissions for an Integrated Dispatch System," to Ingman et al.

FIG. 3 and the following discussion are intended to provide a brief, general description of the computer 110 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating the computer 110 configured to provide a GUI, such as the GUI 400 of FIG. 5, that aids in the reallocation of the technicians 102 across the turfs 104, in accordance with exemplary embodiments. The computer 110 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. According to exemplary embodiments, the memory 204 includes the reallocation module 112. In one embodiment, the reallocation module 112 is embodied in computer-readable media containing instructions that, when executed by the processing unit 202, generates a GUI, such as the GUI 400 of FIG. 5, containing information related to the reallocation of the technicians 102 across a plurality of the turfs 104, as described in greater detail below. Exemplary information related to the reallocation across a plurality of the turfs 104 includes, but is not limited to, the physical proximity between the technicians 102, the availability of the technicians 102, the physical proximity between the turfs 104, the existing load on each of the turfs 104, and the anticipated load on each of the turfs 104. According to further embodiments, the reallocation module 112 may be embodied in hardware, software, firmware, or any combination thereof.

As illustrated in FIG. 3, the reallocation module 112 includes a future job module 216. In one embodiment, the future job module 216 is embodied in computer-readable media containing instructions that, when executed by the processing unit 202, provides future job information, as described in greater details below. According to further embodiments, the future job module 216 may be embodied in hardware, software, firmware, or any combination thereof.

As described above, a future job may refer to a job scheduled for a future work shift (i.e., ahead of a current work shift). Future job information may refer to any suitable information related to the future job, including, but not limited to, a number of future jobs available, a job ID number, a type of work to be performed on the future job, and a duration of time with which a technician is expected to complete the future job. In one embodiment, the future job module 216 provides the future job information via a GUI, such as the GUI 400 of FIG. 5. The GUI 400 enables the future job information to be displayed in an organized, visual presentation. As described in greater detail below, the GUI 400 may include a future job column, such as a Futures column 430. Under the Futures column 430 may be a plurality of cells, such as a cell 438. Each of the plurality of cells corresponding to a given turf, such as the turfs 402, 404, 406, 408, 410, 412, and a given bucket, such as buckets 414, 416, 418, 420, 422. Each cell may specify a number of future jobs in the given turf that can be moved to the current work shift. In one embodiment, each cell, such as the cell 438, under the Futures column 430 in the GUI 400 may be accessed by the LBS to retrieve additional future job information via, for example, a drop-down window, such as a drop-down window 700 of FIG. 8.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 110.

The user interface devices 206 may include one or more devices with which a user accesses the computer 110. The user interface devices 206 may include, but are not limited to, computers, servers, personal digital assistants, cellular phones, or any suitable computing devices. In one embodiment, the computer 110 functions as a web server located remotely from the LBS 106 by executing a web server application, such as BEA WEBLOGIC SERVER from BEA SYSTEMS. By enabling the computer 110 to function as a web server, the LBS 106 may access the GUI 400 generated by the computer 110 over a network, such as the network 214, using, for example, a local web browser interface on a PC or other computing device.

According to exemplary embodiments, the I/O devices 208 enable a user to interface with the reallocation module 112. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, and an electronic stylus. Further, the I/O devices 208 may include one or more output devices, such as, but not limited to, a display screen and a printer.

The network devices 210 enable the computer 110 to communicate with other networks or remote systems via the network 214. Examples of the network devices 210 may include, but are not limited to, a modem, a radio frequency ("RF") or infrared ("IR") transceiver, a telephonic interface, a bridge, a router, or a network card. The network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 4 is a block diagram of a workforce reallocation system 300, in accordance with exemplary embodiments. The workforce reallocation system 300 includes the computer 110, a network dispatch center ("NDC") 302, and the data storage unit 114, each of which is operatively connected to the network 214. The NDC 302 includes a load balance PC 304, which is utilized by the LBS 106, according to one embodiment. In further embodiments, the NDC 302 may include any suitable number of load balance PCs 304 to be utilized by any suitable number of LBSs 106. The data storage unit 114 may store any suitable data regarding the technicians 102, such as their location, skills, schedule, and availability. In one embodiment, the reallocation module 112 retrieves data from the data storage unit 114 to generate a GUI, such as the GUI 400 of FIG. 5. The data storage unit 114 may be a database. In one embodiment, the data storage unit 114 is an IDS.

The load balance PC 304 includes a display 306 and a mouse 308, according to one embodiment. In further embodiments, the load balance PC 304 may include any suitable input/output devices 208. It will be apparent to one having ordinary skill in the art that the load balance PC 304 may be substituted with any suitable computing device, such as a personal digital assistant or a cellular phone. The display 306 may be configured to display the GUI 400 and the future job information provided by the future job module 216.

In exemplary embodiments, the load balance PC 304 includes a web browser 310, such as INTERNET EXPLORER from MICROSOFT CORPORATION, for accessing the GUI 400 and for facilitating communications between the LBS 106 and the computer 110. Using the web browser 310, the LBS 106 may access the GUI 400 by inputting a Uniform Resource Locator ("URL") into the web browser 310. The load balance PC 304 may communicate with the computer 110 via Hypertext Transfer Protocol ("HTTP"). As previously described, the computer 110 may function as a web server. In one embodiment, access to the GUI 400 by the load balance PC 304 may be restricted by a login screen requiring, for example, a login identification and a password. In further embodiments, communications between the load balance PC 304 and the computer 110 may be encrypted by any suitable encryption mechanism.

In exemplary embodiments, the computer 110 may communicate with the data storage unit 114 via a Java Database Connectivity ("JDBC") application program interface ("API"). In one embodiment, the computer 110 retrieves data from the data storage unit 114 at regular intervals, such as every two to five minutes. In further embodiments, the computer 110 retrieves data from the data storage unit 114 when requested by the LBS 106. In other embodiments, the reallocation module 112 may be stored on the load balance PC 304 such that the GUI 400 is accessed from the load balance PC 304 and such that the load balance PC 304 communicates with and retrieves data from the data storage unit 114.

FIG. 5 is an exemplary embodiment of the GUI 400. In one embodiment, the GUI 400 is generated by the reallocation module 112 of the computer 110. The LBS 106 may view the GUI 400 on the display 306 via the web browser 310 associated with the load balance PC 304. In one embodiment, various portions of the GUI 400 are accessible by an input device, such as the mouse 308. It should be appreciated that the GUI 400 illustrated in FIG. 5 is only an exemplary embodiment. It will be apparent to one having ordinary skill in the art that in other embodiments, the GUI 400 may be displayed differently (e.g., as a map presentation), may omit certain fields, or may include other fields.

According to exemplary embodiments, the GUI 400 includes a plurality of turfs, such as an Alabaster turf 402, a Calera turf 404, a Chelsea turf 406, a Columbiana turf 408, a Montevallo turf 410, and a Riverchase turf 412 in a Turf column 415. The GUI 400 may further include a plurality of buckets: a POTS bucket 414, a DSL bucket 416, a Cable bucket 418, a Specials bucket 420, and a Non-Demand ("ND") bucket 422. According to exemplary embodiments, each of the buckets 414, 416, 418, 420, 422 includes four columns: an Hours column 424, a Tickets column 426, a Dispatched Technicians (hereinafter referred to as Dispatches) column 428, and a Future Tickets (hereinafter referred to as Futures) column 430. Each of a plurality of cells 432, 434, 436, 438 may be associated with a column, a bucket, and a turf. For example, the cell 432 is associated with the Hours column 424, the POTS bucket 414, and the Alabaster turf 402.

A turf, such as the Alabaster turf 402, may refer to any suitable geographic area. For example, the Alabaster turf 402 refers to the city of Alabaster, Ala. As illustrated in FIG. 5, the GUI 400 displays the turfs, such as the turfs 402, 404, 406, 408, 410, 412, contained in a southeast Birmingham assignment group ("AG") 452. In one embodiment, the NDC 302 includes a plurality load balance PCs, such as the PC 304, where each load balance PC corresponds to a different AG, such as the AG 452.

According to exemplary embodiments, the POTS bucket 414 contains information related to POTS related work orders. The DSL bucket 416 contains information related to DSL related work orders. The Cable bucket 418 contains information related cable related work orders. The Specials bucket 420 contains information related to special circuit related work orders, such as Digital Signal 1 ("DS1") and Digital Signal 3 ("DS3"). The ND bucket 422 is a catch-all bucket containing information related to work orders not categorized in the POTS bucket 414, the DSL bucket 416, the Cable bucket 418, or the specials bucket 420.

The Hours column 424 indicates the number of hours of pending and assigned work orders in each turf 402, 404, 406, 408, 410, 412. For example, the cell 432 indicates that there are ten hours of pending and assigned POTS related work orders in the Alabaster turf 402. As used herein, an assigned work order is defined as a work order that is assigned to a technician, such as the technician 102, and a pending work order is defined as a work order that is not assigned to a technician 102 and is to be completed within the current business day.

In one embodiment, each cell, such as the cell 432, in the Hours column 424 may be accessed by an input device, such as the mouse 308. For example, the Hours column 424 may be accessed by hovering a mouse cursor over the cell 432 or by clicking the cell using the mouse 308. In response to accessing a cell, such as the cell 432, in the Hours column 424, the GUI 400 may display a window, such as a drop-down window 500 illustrated in FIG. 6, according to exemplary embodiments. The drop-down window 500 may include a job ID column 502, a job type column 504, a status column 506, a job duration column 508, a technician name column 510, and a technician ID column 512. According to exemplary embodiments, the job ID column 502 identifies a particular job. The job type column 504 identifies the type of work to be done on that job. The status column 506 indicates whether the job has been assigned or is pending. The job duration column 508 indicates the anticipated duration of the job. The technician name column 510 and the technician ID column 512 identify a particular technician, such as the technician 102, assigned to the job. The technician name column 510 and the technician ID column 512 may be blank for pending jobs, as shown at 514. Although not shown in FIG. 6, the drop-down window 500 may include a terminate button with which to close the drop-down window 500.

Referring again to FIG. 5, the Tickets column 426 may indicate the number of tickets (i.e., work orders) corresponding to the number of hours shown in the Hours column 424 of one of the buckets 414, 416, 418, 420, 422. For example, the cell 434 indicates that six tickets are assigned and pending. The six tickets indicated in the cell 434 correspond to the ten hours of work indicated in cell 432. In one embodiment, each cell, such as the cell 434, in the Tickets column 426 may be accessed by an input device, such as the mouse 308. For example, the Tickets column 426 may be accessed by hovering a mouse cursor over the cell 434 or by clicking the cell using the mouse 308. In response to accessing a cell, such as the cell 434, in the Tickets column 426, GUI 400 may display a window (not shown), such as a drop-down window, according to one embodiment. The drop-down window may provide additional information about the pending and assigned tickets, such as the type of work to be performed in each ticket.

The Dispatches column 428 indicates the number of the technicians 102 dispatched. For example, the cell 436 indicates that four technicians 102 are dispatched to perform POTS related work orders in the Alabaster turf 402. In one embodiment, each cell, such as the cell 436, in the Dispatches column 428 may be accessed by an input device, such as the mouse 308. For example, the Dispatches column 428 may be accessed by hovering a mouse cursor over the cell 436 or by clicking the cell using the mouse 308. In response to accessing a cell, such as the cell 436, in the Dispatches column 428, the GUI 400 may display a window, such as a drop-down window 600 illustrated in FIG. 7, according to exemplary embodiments. The drop-down window 600 includes a technician ID column 602, a technician name column 604, a technician status column 606, a next turf column 608, a next bucket column 610, and a skills column 612. According to exemplary embodiments, the technician ID column 602 and the technician name column 604 identify a particular technician, such as the technician 102, that has been dispatched. The technician status column 606 indicates whether the identified technician 102 is on his/her last dispatch (indicated by a "*" in the technician status column 606) or is assigned to another job (indicated by an "A" in the technician status column 606). The next turf column 608 and the next bucket column 610 may identify the turf and bucket, respectively, for the next job if the identified technician 102 has been assigned to another job (i.e., the technician status column 606 is "A"). The skills column 612 identifies one or more skills currently assigned to the identified technician 102. Although not shown in FIG. 7, the drop-down window 600 may include a terminate button with which to close the drop-down window 600.

Referring again to FIG. 5, the Futures column 430 indicates the number of future jobs to be completed, according to exemplary embodiments. For example, the cell 438 indicates that six jobs are to be completed in the future. In one embodiment, a future job is a job to be completed between one and three days. In further embodiments, a future job may be a job to be completed within any suitable time frame beyond the time frame for a pending job, as previously described. In one embodiment, each cell, such as the cell 438, in the Futures column 430 may be accessed by an input device, such as the mouse 308, to retrieve additional future job information. For example, the Futures column 430 may be accessed by hovering a mouse cursor over the cell or by clicking the cell 438 using the mouse 308. In response to accessing a cell, such as the cell 438, in the Futures column 430, the GUI 400 may display a window, such as a drop-down window 700 illustrated in FIG. 8, according to exemplary embodiments. The drop-down window 700 may include a job ID column 702, a job type column 704, a job status column 706, an access begin column 708, and an access end column 710. According to exemplary embodiments, the job ID column 702 identifies a particular future job. The job type column 704 identifies the type of work to be done on the identified future job. The job status column 706 indicates whether the identified future job is pending or assigned. The access begin column 708 and the access end column 710 indicate the beginning and the end, respectively, of a time frame with which a technician, such as the technician 102, is scheduled to perform the identified future job. The drop-down window 700 further includes a terminate button 712 with which to close the drop-down window 700.

The GUI 400 further includes a Regional Maintenance Center ("RMC") column 440, which indicates the RMC number designated to a particular turf, according to exemplary embodiments. In one embodiment, each RMC number listed under the RMC column 440 may be accessible by an input device, such as the mouse 308. For example, a RMC number may be accessed by hovering a mouse cursor over the RMC number or by clicking the RMC number using the mouse 308. In response to accessing the RMC number, the GUI 400 may display a window, such as a drop-down window, according to one embodiment. The window may include information related to each of the buckets 414, 416, 418, 420, 422, such as hours, tickets, and dispatches.

Figure 9:
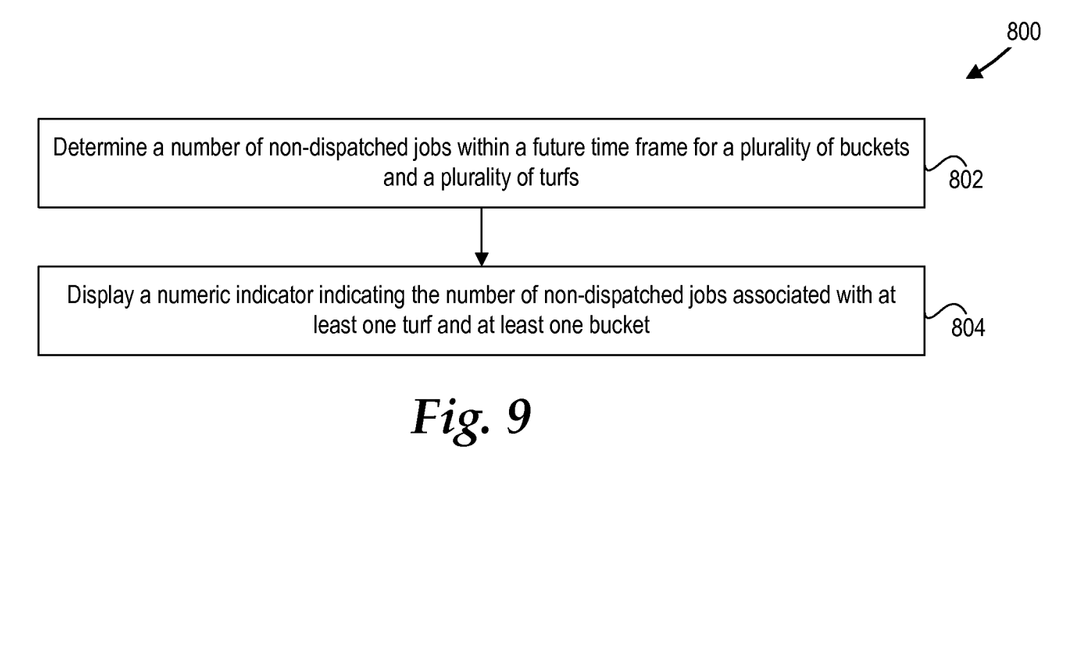
FIG. 9 is a flow diagram illustrating a method for providing future job information, in accordance with exemplary embodiments.

FIG. 9 is a flow diagram illustrating a method 800 for providing future job information, in accordance with exemplary embodiments. According to the method 800, the future job module 216 determines (at 802) a number of non-dispatched jobs within a future time frame for a plurality of buckets 414, 416, 418, 420, 422 and a plurality of turfs 402, 404, 406, 408, 410, 412. In one embodiment, the future time frame is between one day and three days ahead of a current day. In further embodiments, the future time frame may be any suitable time frame ahead of a current work shift of the technicians 102. Data for determining the number of non-dispatched jobs within the future time frame may be retrieved from the data storage unit 114, such as an IDS.

The future job module 216 displays (at 804) a numeric indicator indicating the number of non-dispatched jobs associated with at least one turf 402, 404, 406, 408, 410, 412 and at least one bucket 414, 416, 418, 420, 422. In one embodiment, the future job module 216 displays a plurality of numeric indicator, each of the plurality of numeric indicators corresponding to one turf 402, 404, 406, 408, 410, 412 and bucket 414, 416, 418, 420, 422 pair. For example, the cell 438 indicates that six future jobs correspond to the Alabaster turf 402 and POTS bucket 414 pair.

Figure 8:
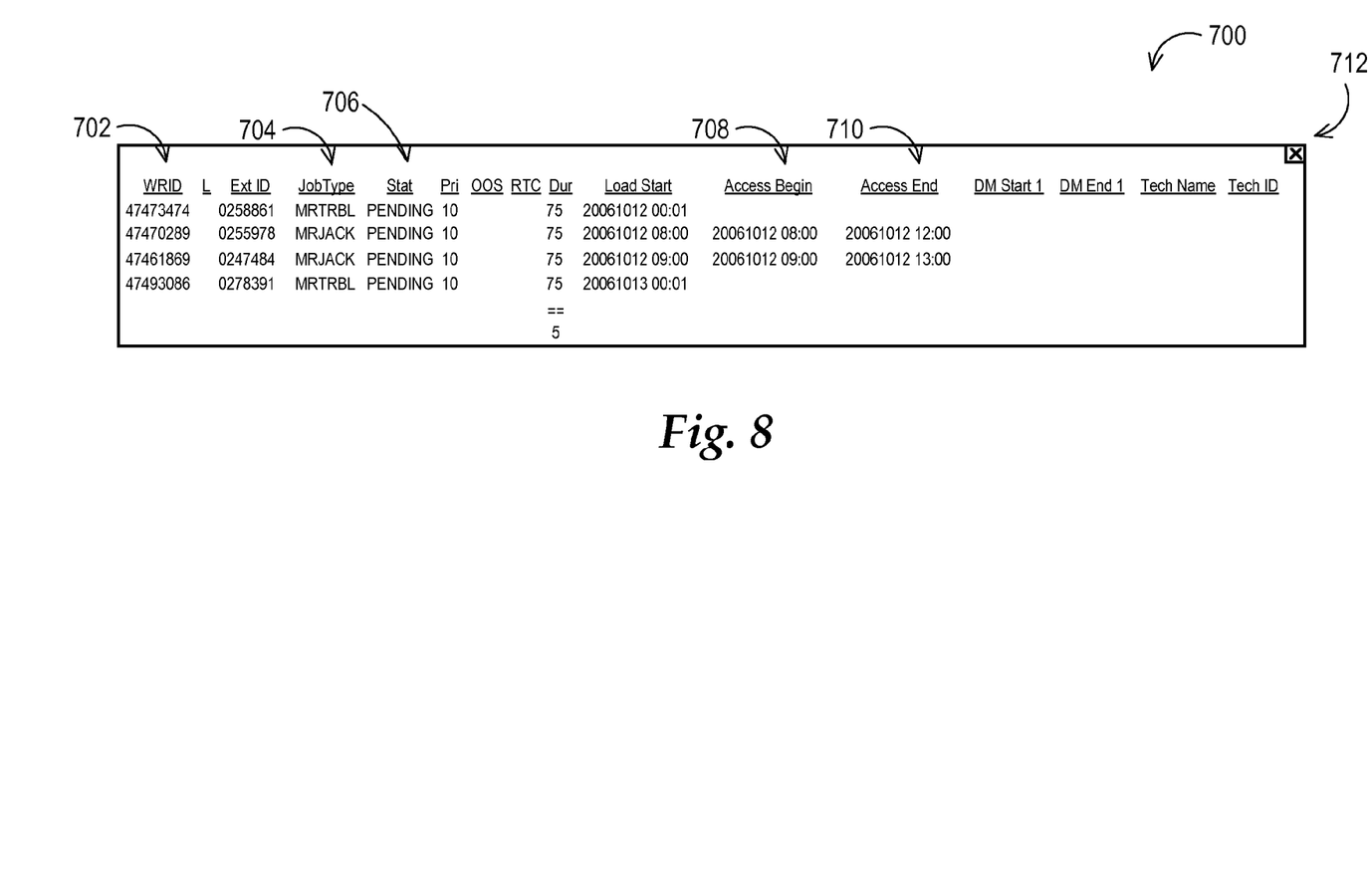
FIG. 8 is a diagram of another drop-down window in the GUI of FIG. 5, in accordance with exemplary embodiments.

According to exemplary embodiments, the numeric indicator is displayed in a GUI, such as the GUI 400, under a Futures column, such as the Futures column 430. Each cell, such as the cell 438, in the Futures column 430 may be accessed by an input device, such as the mouse 308, to retrieve additional future job information. In response to accessing a cell, such as the cell 438, in the Futures column 430, the GUI 400 may display a window, such as the drop-down window 700. The additional future job information may include, but is not limited to, a number of future jobs available, a job ID number, a type of work to be performed on the future job, and a duration of time with which a technician, such as the technician 102, is expected to complete the future job.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing future job information, the method comprising:
displaying, in a graphical user interface provided by a computer having a processor and a memory, a grid having a plurality of turfs as rows on the grid and a plurality of buckets as columns on the grid, wherein each of the turfs represents a geographic location and each of the buckets represents a discipline;
displaying, by the computer in the graphical user interface, a plurality of hours columns, each of the plurality of hours columns arranged under one of the columns, each of the plurality of hours columns comprising a first plurality of cells, each of the first plurality of cells corresponding to one of the rows;
displaying, by the computer in the graphical user interface, a plurality of futures columns, each of the plurality of futures columns arranged under one of the columns, each of the plurality of futures columns comprising a second plurality of cells, each of the second plurality of cells corresponding to one of the rows;
identifying, by the computer, a plurality of turf-bucket pairs, each of the plurality of turf-bucket pairs comprising one of the plurality of turfs and one of the plurality of buckets;
determining, by the computer, a number of non-dispatched jobs scheduled for a future time frame for each of the plurality of turf-bucket pairs; and
upon determining the number of non-dispatched jobs within the future time frame for each of the plurality of turf-bucket pairs, populating, by the computer, each of the second plurality of cells in the graphical user interface with the number of non-dispatched jobs within the future time frame for a corresponding one of the plurality of turf-bucket pairs.

2. The method of claim 1, wherein the future time frame is between one day and three days, inclusive, ahead of a current day.

3. The method of claim 1, wherein displaying, by the computer in the graphical user interface, a plurality of futures columns comprises displaying, in the graphical user interface a plurality of additional columns, the plurality of additional columns comprising the plurality of futures columns and a plurality of other columns, the plurality of additional columns arranged under one of the columns, each of the plurality of other columns comprising a plurality of other cells, each of the plurality of other cells corresponding to one of the rows.

4. The method of claim 1, further comprising:
receiving, via the graphical user interface, a request for additional future job information associated with one of the second plurality of cells; and
in response to receiving, via the graphical user interface, the request for additional future job information associated with one of the second plurality of cells, displaying, in the graphical user interface, the additional future job information in a drop-down window dropping down from the one of the second plurality of cells.

5. The method of claim 4, wherein receiving a request for additional future job information comprises receiving a user access of the cell in the graphical user interface via an input device.

6. The method of claim 4, wherein the additional future job information comprises for each of the non-dispatched jobs, a job identification number, a type of work to be performed on the non-dispatched job, and a duration of time with which a technician is expected to complete the non-dispatched job.

7. The method of claim 1, wherein determining, by the processor, a number of non-dispatched jobs scheduled for a future time frame for each of the plurality of turf-bucket pairs comprises:
retrieving future job data from an integrated dispatch system; and
determining the number of non-dispatched jobs scheduled for the future time frame for each of the plurality of turf-bucket pairs based on the future job data.

8. A system for providing future job information, comprising:
- a processor; and
- a memory storing instructions that, when executed by the processor, cause the processor to perform operations comprising
  - displaying, in a graphical user interface, a grid having a plurality of turfs as rows on the grid and a plurality of buckets as columns on the grid, wherein each of the turfs represents a geographic location and each of the buckets represents a discipline,
  - displaying, in the graphical user interface, a plurality of hours columns, each of the plurality of hours columns arranged under one of the columns, each of the plurality of hours columns comprising a first plurality of cells, each of the first plurality of cells corresponding to one of the rows,
  - displaying, in the graphical user interface, a plurality of futures columns, each of the plurality of futures columns arranged under one of the columns, each of the plurality of futures columns comprising a second plurality of cells, each of the second plurality of cells corresponding to one of the rows,
  - identifying a plurality of turf-bucket pairs, each of the plurality of turf-bucket pairs comprising one of the plurality of turfs and one of the plurality of buckets,
  - determining a number of non-dispatched jobs scheduled for a future time frame for each of the plurality of turf-bucket pairs, and
  - upon determining the number of non-dispatched jobs within the future time frame for each of the plurality of turf-bucket pairs, populating each of the second plurality of cells in the graphical user interface with the number of non-dispatched jobs within the future time frame for a corresponding one of the plurality of turf-bucket pairs.

9. The system of claim 8, wherein the future time frame is between one day and three days, inclusive, ahead of a current day.

10. The system of claim 8, wherein displaying, in the graphical user interface, a plurality of futures columns comprises displaying, in the graphical user interface a plurality of additional columns, the plurality of additional columns comprising the plurality of futures columns and a plurality of other columns, the plurality of additional columns arranged under one of the columns, each of the plurality of other columns comprising a plurality of other cells, each of the plurality of other cells corresponding to one of the rows.

11. The system of claim 8, wherein the operations further comprise:
- receiving, via the graphical user interface, a request for additional future job information associated with one of the second plurality of cells; and
- in response to receiving, via the graphical user interface, the request for additional future job information associated with one of the second plurality of cells, displaying, in the graphical user interface, the additional future job information in a drop-down window dropping down from the one of the second plurality of cells.

12. The system of claim 11, wherein the additional future job information comprises for each of the non-dispatched jobs, a job identification number, a type of work to be performed on the non-dispatched job, and a duration of time with which a technician is expected to complete the non-dispatched job.

13. The system of claim 8, wherein determining a number of non-dispatched jobs scheduled for a future time frame for each of the plurality of turf-bucket pairs comprises:
- retrieving future job data from an integrated dispatch system; and
- determining the number of non-dispatched jobs scheduled for the future time frame for each of the plurality of turf-bucket pairs based on the future job data.

14. A non-transitory computer-readable storage medium having instructions stored thereon that, when executed by a processor, cause the processor to perform operations for providing future job information, the operations comprising:
- displaying, in a graphical user interface, a grid having a plurality of turfs as rows on the grid and a plurality of buckets as columns on the grid, wherein each of the turfs represents a geographic location and each of the buckets represents a discipline;
- displaying, in the graphical user interface, a plurality of hours columns, each of the plurality of hours columns arranged under one of the columns, each of the plurality of hours columns comprising a first plurality of cells, each of the first plurality of cells corresponding to one of the rows;
- displaying, in the graphical user interface, a plurality of futures columns, each of the plurality of futures columns arranged under one of the columns, each of the plurality of futures columns comprising a second plurality of cells, each of the second plurality of cells corresponding to one of the rows;
- identifying a plurality of turf-bucket pairs, each of the plurality of turf-bucket pairs comprising one of the plurality of turfs and one of the plurality of buckets;
- determining a number of non-dispatched jobs scheduled for a future time frame for each of the plurality of turf-bucket pairs; and
- upon determining the number of non-dispatched jobs within the future time frame for each of the plurality of turf-bucket pairs, populating each of the second plurality of cells in the graphical user interface with the number of non-dispatched jobs within the future time frame for a corresponding one of the plurality of turf-bucket pairs.

15. The computer-readable storage medium of claim 14, wherein the future time frame is between one day and three days, inclusive, ahead of a current day.

16. The computer-readable storage medium of claim 14, wherein displaying, in the graphical user interface, a plurality of futures columns comprises displaying, in the graphical user interface a plurality of additional columns, the plurality of additional columns comprising the plurality of futures columns and a plurality of other columns, the plurality of additional columns arranged under one of the columns, each of the plurality of other columns comprising a plurality of other cells, each of the plurality of other cells corresponding to one of the rows.

17. The computer-readable storage medium of claim 14, wherein the operations further comprise:
- receiving, via the graphical user interface, a request for additional future job information associated with one of the second plurality of cells; and
- in response to receiving, via the graphical user interface, the request for additional future job information associated with one of the second plurality of cells, displaying, in the graphical user interface, the additional future job information in a drop-down window dropping down from the one of the second plurality of cells.

18. The computer-readable storage medium of claim 17, wherein receiving a request for additional future job information comprises receiving a user access of the cell in the graphical user interface via an input device.

19. The computer-readable storage medium of claim 17, wherein the additional future job information comprises for each of the non-dispatched jobs, a job identification number, a type of work to be performed on the non-dispatched job, and a duration of time with which a technician is expected to complete the non-dispatched job.

20. The computer-readable storage medium of claim 14, wherein determining a number of non-dispatched jobs scheduled for a future time frame for each of the plurality of turf-bucket pairs comprises:
    retrieving future job data from an integrated dispatch system; and
    determining the number of non-dispatched jobs scheduled for the future time frame for each of the plurality of turf-bucket pairs based on the future job data.

\* \* \* \* \*